(12) United States Patent
Ristic et al.

(10) Patent No.: US 8,616,840 B2
(45) Date of Patent: Dec. 31, 2013

(54) SEALING ARRANGEMENT, SEALING RING AND USE THEREOF

(75) Inventors: Ivan Ristic, Hamburg (DE); Dieter Von Borstel, Guderhandviertel (DE)

(73) Assignee: Carl Freudenberg KG, Weinheim (DE)

( * ) Notice: Subject to any disclaimer, the term of this patent is extended or adjusted under 35 U.S.C. 154(b) by 1229 days.

(21) Appl. No.: 12/154,791

(22) Filed: May 27, 2008

(65) Prior Publication Data
US 2008/0315527 A1 Dec. 25, 2008

(30) Foreign Application Priority Data
May 30, 2007 (EP) ..................................... 07010700

(51) Int. Cl.
*F16J 15/34* (2006.01)

(52) U.S. Cl.
USPC ....................... 415/174.2; 415/231

(58) Field of Classification Search
USPC ............... 415/231, 174.2; 277/549, 551, 562, 277/566, 567
See application file for complete search history.

(56) References Cited

U.S. PATENT DOCUMENTS

| 4,560,174 | A | * | 12/1985 | Bisi | 277/382 |
| 4,582,366 | A | * | 4/1986 | Burfield et al. | 305/104 |
| 4,709,932 | A | * | 12/1987 | Edlund et al. | 277/550 |
| 4,984,968 | A | * | 1/1991 | Laverion | 416/146 A |
| 6,059,526 | A | * | 5/2000 | Mayr | 415/231 |
| 7,513,506 | B2 | * | 4/2009 | Kondo et al. | 277/353 |
| 2006/0237916 | A1 | * | 10/2006 | Peter et al. | 277/438 |

FOREIGN PATENT DOCUMENTS

| DE | 3016231 | A | * | 11/1981 |
| DE | 4124221 | A1 | * | 1/1993 |
| FR | 1075703 | A | * | 10/1954 |
| WO | WO 2005100794 | A1 | * | 10/2005 |

\* cited by examiner

*Primary Examiner* — Edward Look
*Assistant Examiner* — Jesse Prager
(74) *Attorney, Agent, or Firm* — Pearl Cohen Zedek Latzer Baratz LLP

(57) ABSTRACT

A sealing arrangement is provided, including a sealing ring for sealing two machine elements from one another, the sealing ring being conFIGUREd in an installation space for the second machine element that is open toward the first machine element to be sealed, and sealingly contacting the surface to be sealed of the first machine element, by way of at least one dynamically loaded first sealing lip. The sealing ring is arranged under elastic axial and radial preloading within the installation space.

12 Claims, 1 Drawing Sheet

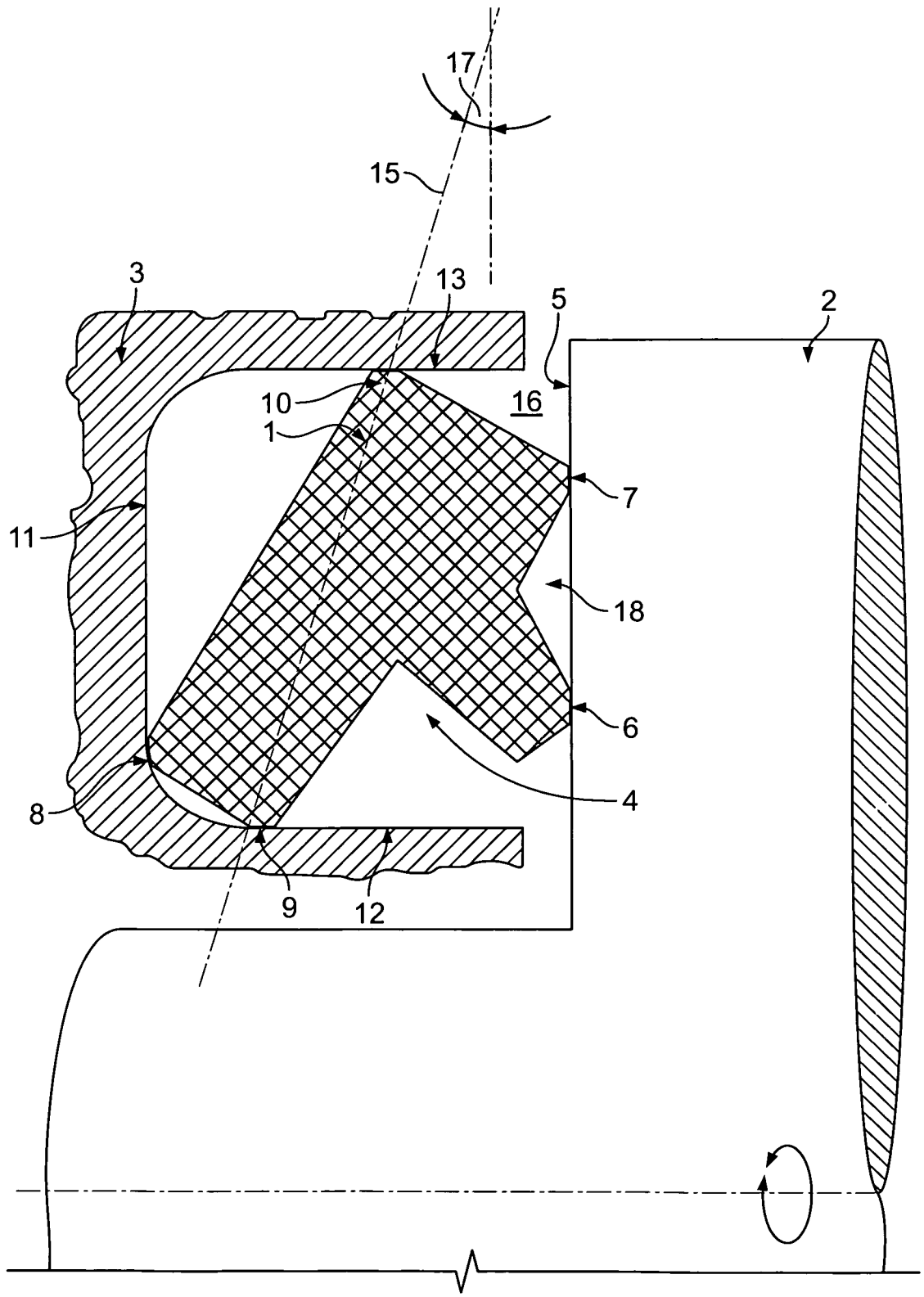

US 8,616,840 B2

SEALING ARRANGEMENT, SEALING RING AND USE THEREOF

This application claims priority to European Patent Application No. EP07010700, filed May 30, 2007 and hereby incorporated by reference herein.

FIELD OF THE INVENTION

The present invention relates to a sealing arrangement, including a sealing ring for sealing two machine elements from one another, the sealing ring being conFIGUREd in an installation space for the second element that is open toward the first machine element to be sealed, and sealingly contacting the surface to be sealed of the first machine element, by way of at least one dynamically loaded first sealing lip.

BACKGROUND OF THE INVENTION

A sealing arrangement of this kind, which includes a sealing ring, is generally known, for example, from the German Patent Application DE 103 14 533 A1. As a sealing ring, the sealing arrangement includes a grooved ring of a tough plastic, which is disposed in a radially inwardly open U-shaped installation space of the second machine element, and is conFIGUREd as a contact seal between the two machine elements under radial preloading in the installation space. On the high-pressure side, the grooved ring has a radially outer, statically loaded sealing lip and a radially inner, dynamically loaded sealing lip. On the low-pressure side, the grooved ring has a contact surface which fittingly contacts the adjacent bounding wall. In the axial direction, the grooved ring is disposed so as to be relatively movable within the installation space. It discusses providing a special grooved ring geometry to improve the durability of the grooved ring by preventing abrasive wear to the grooved ring material, for example.

SUMMARY OF THE INVENTION

An object of the present invention is to further refine a sealing arrangement and a sealing ring of the aforementioned type in a way that will reliably prevent the sealing ring from corotating in the installation space, in particular without necessitating pressurization of the sealing ring, even given a frequent change in the direction of rotation of the first machine element to be sealed.

The present invention provides a sealing ring to be arranged under elastic axial and radial preloading within the installation space. A benefit derived from such an embodiment is that the sealing ring is reliably prevented from corotating within the installation space during normal use of the sealing arrangement, particularly even when, relative to the ambient area, no positive pressure prevails within the space to be sealed that would augment the pressing force exerted by the sealing ring against the surfaces to be sealed of the first and/or second machine element.

There is no need in this context for separately fabricated antirotation devices to prevent the sealing ring from corotating with the first machine element to be sealed. The sealing ring may be manufactured simply and cost-effectively.

The sealing ring may have two spaced apart, mutually adjacent, dynamically loaded first and second sealing lips, which sealingly contact the surface to be sealed of the first machine element, under elastic preloading. The actual sealing lip faces the space to be sealed. The sealing lip, which is conFIGUREd on the side of the first sealing lip facing away from the space to be sealed, is designed as a protective lip. Besides protecting against penetrating dirt particles, it has the task of transmitting the forces from the surface to be sealed, to the sealing ring during assembly, and of thereby ensuring that the sealing ring is tilted in the installation space and, as a result, is positioned/squeezed in, in a rotationally fixed manner within the installation space.

The sealing ring may have at least two static sealing regions and one contact region, the installation space being essentially groove-shaped in design, the first sealing region fittingly contacting the groove base, the contact region fittingly contacting a first bounding wall, and the second sealing region fittingly contacting a second bounding wall of the installation space under elastic preloading. Due to the comparatively large number of static sealing regions and contact regions which contact the groove base and the two bounding walls sealingly and fittingly under elastic preloading, the sealing ring is held in force-locking and rotationally fixed engagement within the installation space, even when, for example, the direction of rotation of the surface to be sealed changes frequently, for example, when the first machine element is designed as a drive of a variable-pitch propeller, or when, following long downtimes, the first sealing lip adheres more forcefully to the surface to be sealed. Even increased friction between the dynamically loaded sealing lips and the surface to be sealed caused by contaminants, for example, has no influence on the rotationally fixed correspondence of the sealing ring to the second machine element.

The installation space may have an essentially C-shaped design and open axially toward a radial projection of the first machine element. In such a case, the surface to be sealed extends perpendicularly to the axis of rotation of the first machine element. Such an embodiment is provided, for example, for sealing adjustable blades of marine screw propellers.

The first machine element may be constituted of a rotationally and/or swivel-mounted shaft. The first machine element may be designed, for example, as a drive of a variable-pitch propeller of a modem marine screw propeller. The sealing arrangement of the present invention is especially advantageous for such a use, since the direction of rotation changes very frequently during the operation of variable-pitch propellers, long downtimes may occur following which the sealing lips adhere more forcefully to the surface to be sealed, and because contaminants often increase the friction between the sealing lips and the surface to be sealed.

The axial and radial preloading of the sealing ring within its installation space secures the sealing ring against rotation within the installation space, the axial and radial preloading being calculated in such a way that, in the nonpressurized operation of the sealing arrangement, the sealing ring is prevented from corotating with the first machine element to be sealed, relative to the second machine element. The wear is thereby reduced to a minimum, and the sealing arrangement exhibits consistently good performance characteristics over a long service life.

To effectively secure the sealing ring against corotation, the ratio of the dimensions of the installation space parallel to the extent of the surface to be sealed, to the dimensions of the sealing ring in the same direction, may be greater than 0.9 in the uninstalled state inherent in the manufacturing process. Such a ratio is essential in terms of achieving a problem-free assembly of the sealing ring in the installation space. The comparatively smaller sealing ring may be readily inserted into the installation space of the second machine element, initially allowing for clearance, in parallel to the direction of the extent of the surface to be sealed, while avoiding assembly errors and/or damage. During assembly of the first machine element to be sealed, the sealing ring is subsequently tilted within the installation space in response to pressure from the surface to be sealed, and thereby automatically braces itself radially and axially against the bounding walls and the groove base of the installation space. The mentioned ratio influences how forcefully the sealing ring is jammed within its installation space in parallel to the extent of the surface to be sealed. The mentioned ratio ensures a problem-free assembly, on the one hand, given adequate compression force, on the other hand, so that a corotation of the sealing ring within its installation space with the first machine element is reliably prevented.

The present invention also relates to a sealing ring for a sealing arrangement, as previously described, the sealing ring having the shape of a grooved ring, and a sealing arrangement and a sealing ring being used, as previously described, for sealing rotational and/or slewing motions of a variable-pitch propeller.

BRIEF DESCRIPTION OF THE DRAWING

An exemplary embodiment of a sealing arrangement according to the present invention is explained in greater detail in the following with reference to the FIGURE.

The sole FIGURE shows a schematic illustration of an exemplary embodiment of a sealing arrangement.

DETAILED DESCRIPTION

The sealing arrangement illustrated in the FIGURE is used for sealing rotational and/or stewing motions of a variable-pitch propeller of a modem marine screw propeller. In this exemplary embodiment, sealing ring 1 is made entirely of a suitable sealing material, which is particularly advantageous in terms of a simple and cost-effective manufacturability. In the illustrated exemplary embodiment, first machine element 2 is designed as a shaft which drives a variable-pitch propeller. Second machine element 3 surrounds first machine element 2 having radially extending surface 5 to be sealed and includes axially open C-shaped installation space 4 in which sealing ring 1 is arranged under elastic axial and radial preloading. The axial and radial preloading is calculated in such a way that the compression force used for squeezing sealing ring 1 axially and radially between first machine element 2 and second machine element 3 suffices for reliably preventing a corotation of the sealing ring with first machine element 2 to be sealed, even when no positive pressure relative to ambient area 16 prevails within space 4 to be sealed.

First sealing region 8 contacts groove base 11 on the side facing space 4 to be sealed; contact region 9 facing space 4 to be sealed contacts first bounding wall 12 on the side facing groove base 11; and second sealing region 10 contacts second bounding wall 13 essentially in the middle thereof. Contact region 9 and second sealing region 10 of the ready-to-use sealing arrangement including sealing ring 1, which is installed in installation space 4 and which sealingly contacts surface 5 to be sealed, are able to be connected in each case in the center by an imaginary connecting line 15, which, in the exemplary embodiment shown in FIG. 1, forms an angle 17 of 18° with surface 5 to be sealed. The ratio of the length of connecting line 15 between contact region 9 and second sealing region 10 to the extent of installation space 4 parallel to the extent of surface 5 to be sealed, is 1:2 in the exemplary embodiment shown in the FIGURE.

Sealing ring 1 has two dynamically loaded sealing lips 6, 7, which sealingly surround surface 5 to be sealed of first machine element 2 under elastic preloading. A sealing surface over the entire area would be conceivable. Second sealing lip 7 facing away from space 4 to be sealed has the task, on the one hand, of keeping contaminants from ambient area 16 away from first sealing lip 6 and, on the other hand, of transmitting forces from surface 5 to be sealed to the profile of sealing ring 1, thereby effecting a tilting of sealing ring 1 within installation space 4 and, as a result, of squeezing sealing ring 1 radially and axially into installation space 4, rotationally fixing the same.

What is claimed is:

1. A sealing arrangement comprising:
a substantially groove-shaped installation space arranged in a second machine element and open towards a first machine element, the installation space comprising a groove base, a first bounding wall and a second bounding wall;
a sealing ring for the mutual sealing of the first machine element from the second machine element, the sealing ring comprising at least one first sealing region, at least one second sealing region, at least one contacting region, and at least first and second dynamically loaded sealing lips;
wherein the sealing ring in an uninstalled state has a dimension that is smaller than a distance parallel to the surface to be sealed between the first bounding wall and the second bounding wall to permit insertion of the sealing element into said installation space; and
wherein the sealing ring in an installed state is arranged under elastic axial and radial preloading in the installation space by being tilted within the installation space relative to the uninstalled state, such that the at least one first sealing region contacts the groove base, the at least one contact region contacts the first bounding wall, the at least one second sealing region contacts the second bounding wall, and the at least first and second sealing lips sealingly contact a surface to be sealed of the first machine element, wherein the first and second sealing lips face away from each other with respect to the surface to be sealed and are arranged under elastic axial and radial preloading within the installation space; and
wherein the sealing ring is tilted from the uninstalled state to the installed state during assembly of the first machine element against the second machine element by pressure exerted by the surface to be sealed against the first sealing lip, such that the first sealing lip transmits forces from the surface to be sealed to the profile of the sealing ring, thereby tilting the sealing ring and squeezing the sealing ring radially and axially into the installation space.

2. The sealing arrangement as recited in claim 1, wherein the first sealing lip and the second sealing lip are spaced apart, mutually adjacent, and dynamically loaded.

3. The sealing arrangement as recited in claim 1, wherein the installation space has a C-shaped design.

4. The sealing arrangement as recited in claim 1, wherein the installation space is open axially toward a radial projection of the first machine element.

5. The sealing arrangement as recited in claim 1, wherein the first machine element comprises a rotationally and/or swivel-mounted shaft.

6. The sealing arrangement as recited in claim 5, wherein the first machine element is a drive of a variable-pitch propeller.

7. The sealing arrangement as recited in claim 1, wherein the axial and radial preloading of the sealing ring within the installation space secures the sealing ring against rotation within the installation space.

8. The sealing arrangement as recited in claim 1, wherein the axial and radial preloading allows for a nonpressurized operation of the sealing arrangement, the sealing ring being prevented from corotating with the first machine element to be sealed, relative to the second machine element.

9. The sealing arrangement as recited in claim 1, wherein a ratio of the dimensions of the installation space parallel to the surface to be sealed to the dimensions of the sealing ring in the same direction is greater than 0.9 in the uninstalled state of the sealing ring.

10. The sealing arrangement as recited in claim 1, wherein:
   the at least one first sealing region contacts the groove base on a side facing a space to be sealed;
   the at least one contact region contacts the first bounding wall on a side facing the space to be sealed at angle with respect to the first bounding wall;
   the at least one second sealing region contacts the second bounding wall essentially in the middle of the second boundary wall on a side facing the space to be sealed;
   wherein the at least one contacting region and the at least one second sealing region are connected by an imaginary connecting line forming an angle of 10° to 30° relative to the surface to be sealed of the first machine element; and
   wherein the ratio of the length of the imaginary connecting line between the contacting region and the second sealing region to the extent of the installation space parallel to the surface to be sealed is greater than 1.

11. A sealing ring for a sealing arrangement as recited in claim 1, wherein the sealing ring has a grooved ring shape.

12. A method for using the sealing arrangement as recited in claim 1 for sealing rotational and/or slewing motions of a variable-pitch propeller.

\* \* \* \* \*